(12) United States Patent  
Wu et al.

(10) Patent No.: US 8,732,971 B2  
(45) Date of Patent: May 27, 2014

(54) THICKNESS DETECTION DEVICE

(75) Inventors: Wenqing Wu, Guangzhou (CN); Weiping Xie, Guangzhou (CN); Wei Zhang, Guangzhou (CN); Yi Tao, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 362 days.

(21) Appl. No.: 13/321,808

(22) PCT Filed: Mar. 22, 2010

(86) PCT No.: PCT/CN2010/071178  
§ 371 (c)(1),  
(2), (4) Date: Dec. 29, 2011

(87) PCT Pub. No.: WO2010/139204  
PCT Pub. Date: Dec. 9, 2010

(65) Prior Publication Data  
US 2012/0096731 A1     Apr. 26, 2012

(30) Foreign Application Priority Data

May 31, 2009   (CN) .......................... 2009 1 0039865

(51) Int. Cl.  
*G01B 5/06*     (2006.01)
(52) U.S. Cl.  
USPC ........................................ 33/501.02; 33/783
(58) Field of Classification Search  
USPC ............. 33/501.02, 501.03, 501.04, 783, 784  
See application file for complete search history.

(56) References Cited

U.S. PATENT DOCUMENTS 5,479,720 A *  1/1996  Hellstrom et al. .......... 33/501.02  
6,141,883 A * 11/2000  Mitchell et al. ............ 33/501.02  
6,289,599 B1 *  9/2001  Leifeld et al. .............. 33/501.02

(Continued)

FOREIGN PATENT DOCUMENTS

CN         2155006 Y       2/1994  
CN         2608947 Y       3/2004

(Continued)

OTHER PUBLICATIONS

International Search Report dated Jun. 17, 2010 from corresponding International Application No. PCT/CN2010/071178.

*Primary Examiner* — Yartiza Guadalupe-McCall  
(74) *Attorney, Agent, or Firm* — Wold, Greenfield & Sacks, P.C.

(57) ABSTRACT

A thickness detection device comprises: a feed roller (130), a thickness detection unit (110,210) and a thickness measurement unit (120,220). The thickness detection unit (110, 210) comprises a detection roller (113, 213) which is contacted with the surface of the feed roller (130), a detection rotating shaft (111, 211) and a reflective board for thickness detection (112, 212); the thickness detection reflective board (112, 212) comprises an enlarging part (112a, 212a) and a bending part (112b, 212b) connected to one end of the enlarging part (112a, 212a); the detection roller (113, 213) and the detection rotating shaft (111, 211) are both arranged on the bending part (112b, 212b), a connection line of the axle centers of the detection roller (113, 213) and the detection rotating shaft (111, 211) is at an included angle with the enlarging part (112a, 212a) of the reflective board for thickness detection (112, 212); and the thickness measurement unit (120, 220) comprises a sensor used for measuring the distance that the enlarging part (112a, 212a) rotates around the detection rotating shaft (111, 211).

10 Claims, 3 Drawing Sheets

(56) References Cited

U.S. PATENT DOCUMENTS

| | | | |
|---|---|---|---|
| 6,993,850 B2* | 2/2006 | Funke | 33/501.02 |
| 7,343,689 B2* | 3/2008 | Kondo | 33/501.04 |
| 7,743,523 B2* | 6/2010 | Schletti et al. | 33/501.03 |
| 2003/0009894 A1* | 1/2003 | Yamamoto | 33/501.02 |
| 2004/0194330 A1* | 10/2004 | Zota | 33/501.03 |
| 2005/0056575 A1 | 3/2005 | Lee | |
| 2007/0234582 A1* | 10/2007 | Kondo | 33/501.04 |
| 2012/0096731 A1* | 4/2012 | Wu et al. | 33/783 |

FOREIGN PATENT DOCUMENTS

| | | |
|---|---|---|
| CN | 2672618 Y | 1/2005 |
| CN | 1743788 A | 3/2006 |
| CN | 101226048 A | 7/2008 |
| CN | 100410617 C | 8/2008 |
| CN | 101566453 A | 10/2009 |
| CN | 201382774 Y | 1/2010 |
| DE | 3934623 A | 4/1991 |
| EP | 0 329 081 A | 8/1989 |
| JP | 2071108 A | 3/1990 |

\* cited by examiner

THICKNESS DETECTION DEVICE

This application claims priority to Chinese Patent Application No. 200910039865.8, filed on May 31, 2009 with the Chinese Patent Office, entitled "Thickness Detection Device", which is incorporated herein by reference in its entirety.

FIELD OF THE INVENTION

The present invention relates to a thickness detection system, in particular, to a thickness detection device for sheet-type media.

BACKGROUND OF THE INVENTION

A typical thickness detection device for sheet-type media generally includes a sensor and a thickness detection unit including a detecting portion and an amplifying portion. When a sheet-type medium passes through the thickness detection device, the sensor measures the movement distance of the amplifying portion of the thickness detecting unit, and then a thickness value of the medium is obtained by calculation. However, a typical thickness detection unit is complex in configuration and easy to result in measuring errors. In addition, it is difficult to determine an initial position of the sensor relative to the thickness detection unit. The accuracy of a final measuring result will be decreased due to the change of the initial position of the sensor. Some thickness detection devices in which the initial position of the sensor is adjustable have been proposed, but an adjustment mechanism therein is complicated in configuration, troublesome in the adjustment process and inconvenient in maintenance.

Thus, a need exists for an improved thickness detection device to overcome the defects mentioned above.

SUMMARY OF THE INVENTION

In view of the shortcomings in the prior art mentioned above, an object of the present invention is to provide a thickness detection device with simple configuration and high measuring accuracy, which is easy to be operated, stable and reliable.

In order to achieve the above object, according to the invention there is provided a thickness detection device, comprising: a feed roller; a thickness measuring unit; and a thickness detection unit including a detection roller in surface contact with the feed roller, a detection shaft, and a thickness detecting reflection plate. The thickness detecting reflection plate comprises an amplifying portion and a bended portion connected to one end of the amplifying portion. The detection roller and the detection shaft are disposed at the bended portion. An included angle is formed between a line connecting an axle center of the detection roller with that of the detection shaft and the amplifying portion of the thickness detecting reflection plate. The thickness measuring unit comprises a sensor for measuring a rotation distance of the amplifying portion around the detection shaft. With the detection shaft functioning as a fulcrum, a lever mechanism is formed by the detection shaft, the detection roller and the thickness detecting reflection plate. A slight distance change occurred during the passage of a sheet-type medium is amplified by means of the lever principle, and then the amplified distance is measured and the thickness of the medium is calculated, which enables the device to be simple in configuration and easy to be implemented.

In an embodiment of the thickness detection device according to the invention, the thickness detection unit further comprises a base including a bottom plate and an extension which is provided at a side of the bottom plate and which has two mounting arms, a pair of positioning holes are correspondingly provided through the mounting arms, the detection shaft passes through the positioning holes and the bended portion of the thickness detecting reflection plate, and the bended portion is located between the two mounting arms.

The thickness measuring unit further comprises a sensor distance adjustment mechanism for adjusting a position of the sensor with regard to the thickness detecting reflection plate, the sensor distance adjustment mechanism comprising a sensor securing plate connected to the base in a manner that the sensor securing plate can move up and down. Measuring results can be more accurate by adjusting an initial position of the sensor relative to the amplifying portion.

In detail, the sensor distance adjustment mechanism further comprises an adjusting screw including a first and a second threaded portions, a thread pitch of the first threaded portion is larger than that of the second threaded portion, the sensor securing plate and the base are, respectively, formed with female threaded studs in correspondence with the first and the second threaded portions. The sensor securing plate is connected to the base through mating the adjusting screw with the female threaded studs at the sensor securing plate and the base. The initial position of the sensor is adjusted by using the adjusting screw having two sections with different thread pitches, which enables the device to be simple in configuration and easy to be assembled and operated.

Preferably, the sensor distance adjustment mechanism further comprises a sensor adjusting compression spring fitted over the adjusting screw and the female threaded studs at the sensor securing plate and the base, in order for eliminating a matching clearance between the screw and the threaded holes.

Preferably, the sensor securing plate comprises a top cover and two second side walls which are located on both opposite sides of the top cover and through which threaded holes are correspondingly provided, the base further comprises two first side walls which are located on both opposite sides of the base and through which two through slots are provided at positions in correspondence with the threaded holes, and the sensor distance adjustment mechanism further comprises a fastener passing through the threaded hole and the through slot so as to fix the top cove in relation to the base.

In another embodiment of the invention, the thickness detection device further comprises a vibration damping mechanism comprising a sensor damping compression spring fitted over the detection shaft and located between the thickness detecting reflection plate and one of the mounting arms of the extension. When the thickness detecting plate vibrates up and down, a pressure applied to the thickness detecting reflection plate by the sensor damping compression spring will decrease its redundant vibrations, which makes the whole device more stable and measuring results more accurate.

Optionally, the vibration damping mechanism further comprises a reflection baffle compression spring located between the thickness detecting reflection plate and the bottom plate of the base, maintaining the thickness detecting reflection plate in the upward initial state at all time, thereby eliminating signal noises caused by configurations and resulting in more accurate measuring results.

BRIEF DESCRIPTION OF THE DRAWINGS

For clearer description of technical solutions in embodiments of the present invention or in the prior art, the Drawings necessary for such description will be now explained in brief. Obviously, the Drawings described below are only illustrative of some of the embodiments of the present invention. Further drawings can be achieved by the skilled in the art in accordance with the Drawings described herein without making any inventive efforts.

DETAILED DESCRIPTION OF THE INVENTION

The technical solutions in embodiments of the present invention will be described clearly and completely with reference to the Drawings thereof. Obviously, the embodiments described are only a part of embodiments of the invention, but not all of them. Based on the embodiments in the invention, all further embodiments which are achieved by the skilled in the art without making inventive efforts will fall within the protective scope of the invention.

Figure 1:
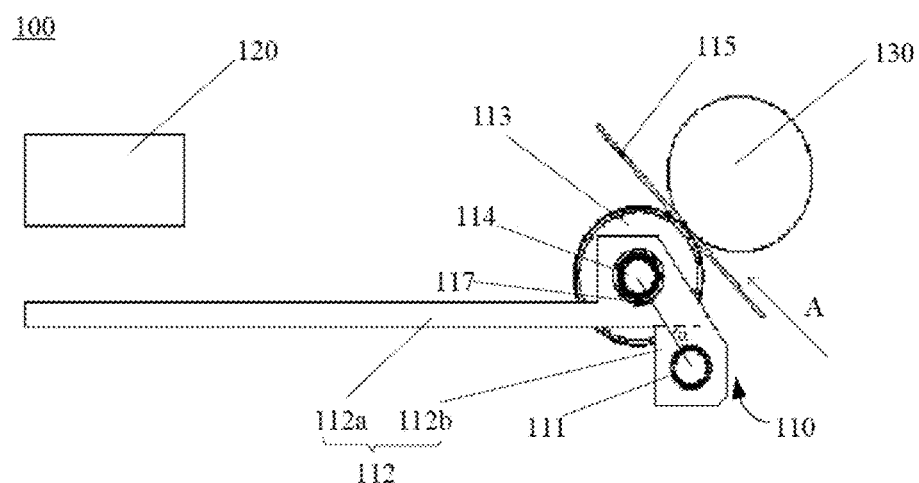
FIG. 1 is a structural schematic view of an embodiment of the thickness detection device according to the present invention.

With reference to FIG. 1, an embodiment of the thickness detection device 100 according to the invention includes: a feed roller 130; a thickness detection unit 110 composed of a detection shaft 111, a detection roller 113 in surface contact with the feed roller 130, and a thickness detecting reflection plate 112 composed of an amplifying portion 112a and a bended portion 112b connected to a side of the amplifying portion 112a, wherein the detection roller 113 and the detection shaft 111 are mounted at the bended portion 112b, there is an included angle α between a line 117 connecting an axle center of the detection roller 113 with that of the detection shaft 111 and the amplifying portion 112a of the thickness detecting reflection plate 112, and the thickness detection unit 110 is fixed by the detection shaft 111; and a thickness measuring unit 120 positioned above the amplifying portion 112a of the thickness detecting reflection plate 112 to measure a rotation distance of the amplifying portion 112a about the detection shaft 111. Specifically, the thickness measuring unit 120 may be a sensor.

With the detection shaft 111 functioning as a fulcrum, a lever mechanism is formed by the detection shaft 111, the detection roller 113 and the thickness detecting reflection plate 112. When a sheet-type medium 115 passes between the feed roller 130 and the detection roller 113, the thickness detecting reflection plate 112 will be caused to rotate about the detection shaft 111 by the movement of the detection roller 113. The thickness of the sheet-type medium 115 is amplified by the lever mechanism, producing an amplified value corresponding to the real thickness. That is, the rotation distance of the thickness detecting reflection plate 112 is a thickness value of the sheet-type medium after amplification, with an amplification factor being dependent on the length of the amplifying portion 112a of the thickness detecting reflection plate 112. The rotation distance of the thickness detecting reflection plate 112 is measured by the thickness measuring unit 120, and the thickness value of the sheet-type medium 115 can then be achieved by calculation. The whole thickness detection device 100 is simple in configuration, easy to be implemented and with an accurate measuring result.

In this embodiment, the detection roller 113 and the detection shaft 111 are positioned on two opposite sides of the amplifying portion 112a of the thickness detecting reflection plate 112, respectively, which leads to a convenient installation and results in a more compact configuration of the thickness detection device.

Figure 2:
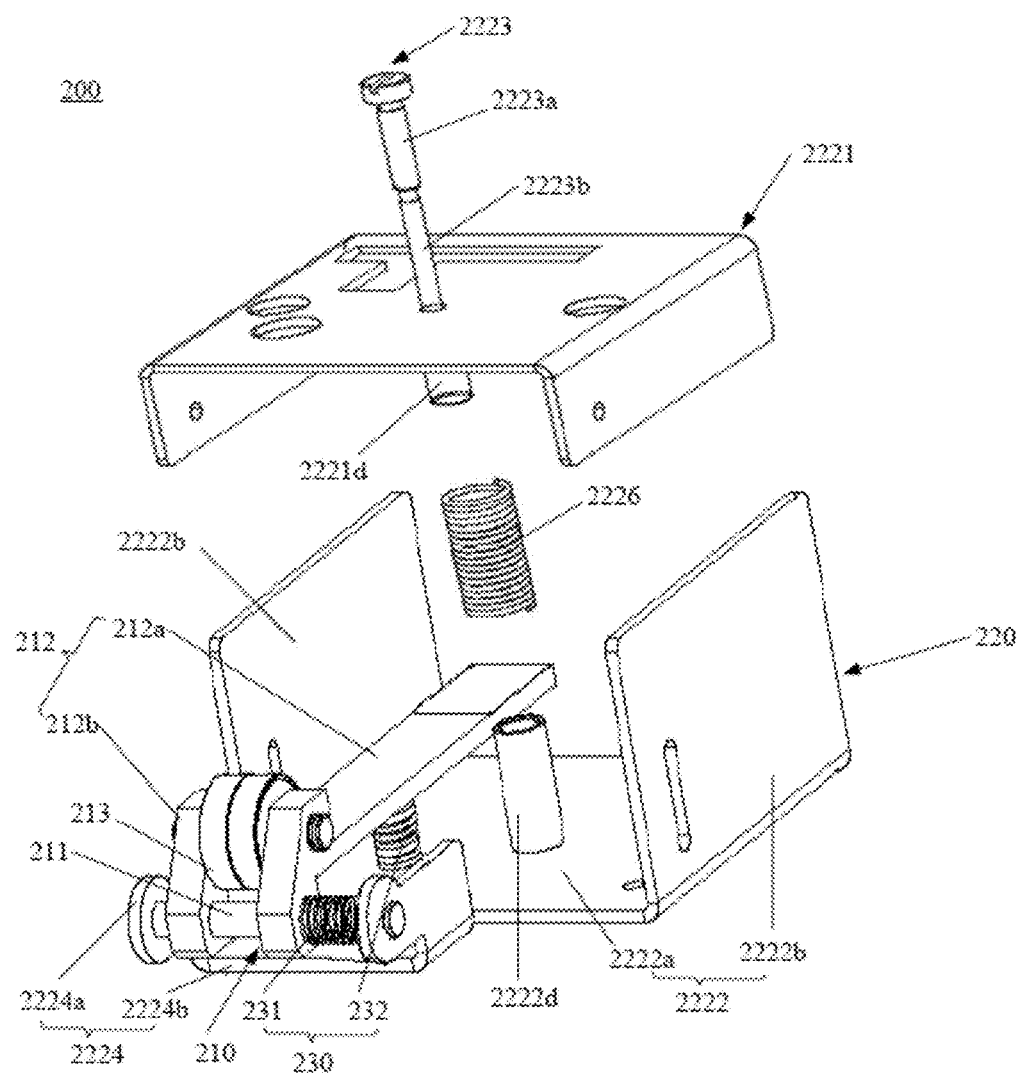
FIG. 2 is a perspective view of another embodiment of the thickness detection device according to the present invention.

FIG. 2 is a structural schematic view of another embodiment of the thickness detection device according to the invention. The thickness detection device 200 of the present embodiment includes: a feed roller (not shown); a thickness detection unit 210 including a detection shaft 211, a detection roller 213 in surface contact with the feed roller, and a thickness detecting reflection plate 212 including an amplifying portion 212a and a bended portion 212b connected to a side of the amplifying portion 212a, wherein the detection roller 213 and the detection shaft 211 are mounted at the bended portion 212b, and an included angle is formed between a line connecting an axle center of the detection roller 213 with that of the detection shaft 211 and the amplifying portion 212a of the thickness detecting reflection plate 212; a thickness measuring unit 220 including a sensor (not shown) and a sensor distance adjustment mechanism 222 carrying the sensor, wherein the sensor distance adjustment mechanism 222 includes a sensor securing plate 2221; and a base 2222 to which the sensor securing plate 2221 connected in a manner of being capable of moving up and down and to which the thickness detection unit 210 is connected via the detection shaft 211.

Figure 3:
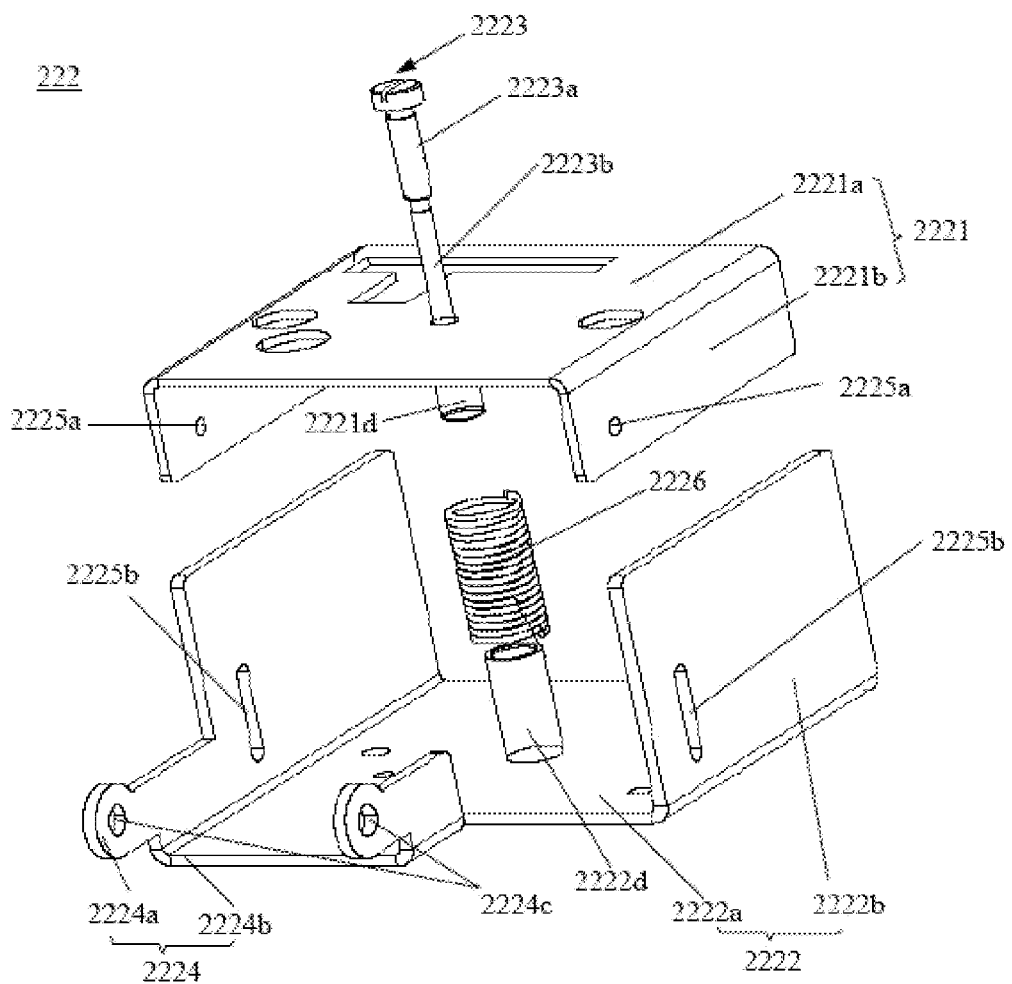
FIG. 3 is a perspective view of a sensor distance adjustment mechanism of the thickness detection device of FIG. 2.

Specifically, as shown in FIGS. 2 and 3, the base 2222 includes a bottom plate 2222a provided with an extension 2224 and first side walls 2222b positioned at two opposite sides of the bottom plate 2222a, wherein the extension 2224 is located to a side of the bottom plate 2222a without the first side walls 222b and includes a connecting plate 2224b provided with two mounting arms 2224a on both sides thereof, with one of the mounting arms 2224a extending from one first side wall 2222b and located in the same plane therewith and the other mounting arm 2224a substantially perpendicular to the bottom plate 2222a and located between the two first side walls 2222b. The mounting arms 2224a are correspondingly provided with a pair of positioning holes 2224c through which the detection shaft 211 passes, thereby the thickness detection unit 210 is mounted within the sensor distance adjustment mechanism 222. The sensor securing plate 2221 includes: a top cover 2221a provided with several through slots and several through holes for installation of the sensor; and two second side walls 2221b formed on two opposite sides of the top cover 2221a.

The sensor distance adjustment mechanism 222 further includes a sensor adjusting compression spring 2226 and an adjusting bolt 2223 provided with a first threaded portion 2223a on a upper threaded rod thereof and a second threaded portion 2223b on a lower threaded rod thereof, with a thread pitch of the first threaded portion 2223a being larger than that of the second threaded portion 2223b. The top cover 2221a of the sensor securing plate 2221 and the bottom plate 2222a of the base 2222 are correspondingly provided with a first and a second female threaded stud 2221d and 2222d which extend toward each other from the top cover 2221a and the bottom plate 2222a and through which are formed a first and a second threaded hole, respectively. The thread pitches of the first and the second threaded holes correspond to those of the first and the second threaded portions 2223a and 2223b of the adjusting bolt 2223, respectively. The upper and the lower threaded rods of the adjusting bolt 2223 are respectively mated with the treaded hole with larger thread pitch of the sensor securing plate 2221 and that with smaller thread pitch of the base 2222, such that the sensor securing plate 2221 is connected to the base 2222 in a manner of being capable of moving up and down. When the adjusting bolt 2223 interacts with the threaded holes on the sensor securing plate 2221 and on the base 2222 simultaneously, rising (descending) linear distances for two sections of threads with different thread pitches caused by one turn of rotation of the adjusting bolt 2223 are different. Here, the sensor securing plate 2221 will correspondingly descend (rise) a certain compensating distance, thereby achieving the purpose of adjusting the position of the sensor. The sensor adjusting compression spring 2226 is disposed to encircle the first and the second female threaded studs 2221d and 2222d, the function of which is to eliminate a matching clearance between the adjusting bolt 2223 and the threaded holes.

Alternatively, the sensor may be disposed on the top cover 2221a of the sensor securing plate 2221 or may be mounted at an inside of a second side wall 2221b.

Preferably, the sensor distance adjustment mechanism further includes a fastener (not shown), such as a screw and so on. As shown in FIG. 3, threaded holes 2225a are correspondingly provided through the two second side walls 2221b of the sensor securing plate 2221, and through slots 2225b are provided through the two first side walls 2222b of the base 2222 at positions in correspondence with the threaded holes 2225a. The screw passes through the threaded hole 2225a and the through slot 2225b. When the adjustment of the relative position between the sensor securing plate 2221 and the base 2222 is done, i.e., after the sensor is adjusted to a correct position, the sensor securing plate 2221 is fixed with regard to the base 2222 through mating the screw with the threaded hole 2225a and with the through slot 2225b by tightening the screw, such that the initial position of the sensor is thereby accurately adjusted.

In addition, with reference to FIG. 2, the thickness detection device 200 further includes a vibration damping mechanism 230. The vibration damping mechanism 230 includes: a sensor damping compression spring 231 which is disposed to encircle (to be fitted over) the detection shaft 211 and located between the bended portion 212b of the thickness detecting reflection plate 212 and a mounting arm 2224a of the extension 2224; and a reflection baffle compression spring 232 fixedly disposed between the amplifying portion 212a of the thickness detecting reflection plate 212 and the bottom plate 2222a of the base 2222. The sensor damping compression spring 231 can damp vibrations occurred by the thickness reflection plate 212 during operation to some extent. Moreover, the reflection baffle compression spring 232 fixedly disposed between the amplifying portion 212a of the thickness detecting reflection plate 212 and the bottom plate 2222a of the base 2222 maintains the thickness detecting reflection plate 212 in the upward initial state at all time, thereby mechanically eliminating unwanted vibrations and leading to a more stable measuring system and more accurate measuring results.

Although the sensor adjusting structure of the present embodiment adjusts the distance between the sensor securing plate and the base by means of female threaded studs in conjunction with an adjusting screw having two sections with different thread pitches, the thickness detection device according to the invention is not limited to this way. In contrast, any structures which enable the relative distance between the sensor securing plate and the base to be changed will fall within the protective scope of the invention. For example, several snapping structures or several traverse slots perpendicular to the through slots may provided at the first side walls, and then the position of the sensor securing plate and thus the initial position of the sensor can be adjusted by means of a fastener in conjunction with these structures.

Since the sensor distance adjustment mechanism applied in the thickness detection device according to the invention is simple in configuration, easy to be operated and implemented, it becomes simple and easy to adjust the initial position of the sensor. In addition, the application of the vibration damping system to the device effectively controls vibrations occurred during the operation of the thickness detecting reflection plate, thereby enabling the whole system to be more stable and the measuring result to be more accurate.

It is to be noted that the sensor distance adjustment mechanism and the vibration damping mechanism described above are independent structures from each other, and the thickness detection device of the present invention may include only one of them.

What is disclosed above is only preferable embodiments of the invention, it of course cannot be considered to limit the protective scope of the invention. Equivalent modifications and changes made according to the attached claims of the invention will still fall within the protective scope thereof.

What is claimed is:

1. A thickness detection device, comprising: a feed roller; a thickness measuring unit; and a thickness detection unit including a detection roller in surface contact with the feed roller, a detection shaft, and a thickness detecting reflection plate, wherein:
    the thickness detecting reflection plate comprises an amplifying portion and a bended portion connected to one end of the amplifying portion;
    the detection roller and the detection shaft are disposed at the bended portion;
    there is an included angle between a line connecting an axle center of the detection roller with that of the detection shaft and the amplifying portion of the thickness detecting reflection plate; and
    the thickness measuring unit comprises a sensor for measuring a rotation distance of the amplifying portion around the detection shaft.

2. The thickness detection device according to claim 1, wherein the thickness detection device further comprises a base including a bottom plate and an extension which is provided at a side of the bottom plate and which has two mounting arms, a pair of positioning holes are correspondingly provided through the mounting arms, the detection shaft passes through the positioning holes and the bended portion of the thickness detecting reflection plate, and the bended portion is located between the two mounting arms.

3. The thickness detection device according to claim 2, wherein the thickness measuring unit further comprises a sensor distance adjustment mechanism for adjusting a position of the sensor with regard to the thickness detecting reflection plate, the sensor distance adjustment mechanism comprising a sensor securing plate which is connected to the base in such a manner that the sensor securing plate can move up and down.

4. The thickness detection device according to claim 3, wherein the sensor distance adjustment mechanism further comprises an adjusting screw including a first and a second threaded portions, a thread pitch of the first threaded portion is larger than that of the second threaded portion, the sensor securing plate and the base are, respectively, formed with female threaded studs in correspondence with the first and the second threaded portions, and the adjusting screw mates with the female threaded studs at the sensor securing plate and the base.

5. The thickness detection device according to claim 4, wherein the sensor distance adjustment mechanism further comprises a sensor adjusting compression spring fitted over the adjusting screw and the female threaded studs at the sensor securing plate and the base.

6. The thickness detection device according to claim 3, wherein
    the sensor securing plate comprises a top cover and two second side walls which are located on both opposite sides of the top cover and through which threaded holes are correspondingly provided, the base further comprises two first side walls which are located on both opposite sides of the bottom plate and through which two through slots are provided at positions in correspondence with the threaded holes, and the sensor distance adjustment mechanism further comprises a fastener passing through the threaded hole and the through slot so as to fix the sensor securing plate in relation to the base.

7. The thickness detection device according to claim 2, wherein the thickness detection device further comprises a vibration damping mechanism comprising a sensor damping compression spring fitted over the detection shaft and located between the thickness detecting reflection plate and one of the mounting arms of the extension.

8. The thickness detection device according to claim 7, wherein the vibration damping mechanism further comprises a reflection baffle compression spring located between the thickness detecting reflection plate and the bottom plate of the base.

9. The thickness detection device according to claim 4, wherein the sensor securing plate comprises a top cover and two second side walls which are located on both opposite sides of the top cover and through which threaded holes are correspondingly provided, the base further comprises two first side walls which are located on both opposite sides of the bottom plate and through which two through slots are provided at positions in correspondence with the threaded holes, and the sensor distance adjustment mechanism further comprises a fastener passing through the threaded hole and the through slot so as to fix the sensor securing plate in relation to the base.

10. The thickness detection device according to claim 5, wherein the sensor securing plate comprises a top cover and two second side walls which are located on both opposite sides of the top cover and through which threaded holes are correspondingly provided, the base further comprises two first side walls which are located on both opposite sides of the bottom plate and through which two through slots are provided at positions in correspondence with the threaded holes, and the sensor distance adjustment mechanism further comprises a fastener passing through the threaded hole and the through slot so as to fix the sensor securing plate in relation to the base.

* * * * *